United States Patent [19]
Li et al.

[11] Patent Number: 6,084,994
[45] Date of Patent: Jul. 4, 2000

[54] TUNABLE, LOW BACK-REFLECTION WAVELENGTH DIVISION MULTIPLEXER

[75] Inventors: Wei-Zhong Li, San Jose; Feng Liu, Sunnyvale; Haiguang Lu, San Jose, all of Calif.

[73] Assignee: Oplink Communications, Inc., San Jose, Calif.

[21] Appl. No.: 09/054,032

[22] Filed: Apr. 2, 1998

[51] Int. Cl.$^7$ ...................................................... G02B 6/26
[52] U.S. Cl. ............................................. 385/31; 359/131
[58] Field of Search ................................. 385/24–47, 16, 385/124, 11, 14, 30; 359/652, 653, 654, 131, 124, 127, 130, 129

[56] References Cited

U.S. PATENT DOCUMENTS

| | | | |
|---|---|---|---|
| 4,244,045 | 1/1981 | Nosu et al. | 370/3 |
| 5,579,420 | 11/1996 | Fukushima | 385/11 |
| 5,612,824 | 3/1997 | Si et al. | 359/652 |
| 5,799,121 | 8/1998 | Duck et al. | 385/47 |
| 5,917,626 | 6/1999 | Lee | 359/131 |

*Primary Examiner*—Akm E. Ullah
*Attorney, Agent, or Firm*—Sawyer Law Group LLP

[57] ABSTRACT

The tunable wavelength division multiplexer is disclosed. The wavelength division multiplexer includes a fiber, a holder, a filter, and an isolator. The fiber carries an optical signal that includes a plurality of channels. The holder has and end and an axis. The holder receives the first fiber in an aperture such that the first fiber is separated from the axis by a distance. The distance is selected to tune the first angle of incidence so that the filter transmits a portion of the optical signal centered around at least one particular wavelength. The optical signal from the fiber impacts the filter at a first angle of incidence. The filter transmits a portion of the optical signal centered around at least one particular wavelength. The isolator is optically coupled with the filter and prevents a first portion of the portion of optical signal transmitted by the filter from returning to the first fiber. Thus, not only is the filter tunable, but because of the presence of the isolator, back reflections to the first fiber are also reduced.

17 Claims, 5 Drawing Sheets

TUNABLE, LOW BACK-REFLECTION WAVELENGTH DIVISION MULTIPLEXER

FIELD OF THE INVENTION

The present invention relates to optical technology and more particularly to a method and system for providing a wavelength division multiplexer which can be tuned and has improved insertion loss and reduced polarization dependent loss.

BACKGROUND OF THE INVENTION

Optical technology offers the capability of transmitting a plurality of signals on a single fiber. As the use of optical technology increases, the number of signals transmitted on a signal fiber also increases. Currently, signals of four, eight, or sixteen different wavelengths are transmitted over a single fiber.

In order to transmit a large number of signals on a given cable, signals carried on a plurality wavelengths are multiplexed together for transmission. After the multiplexed, multi-channel signal reaches the destination, the signals are demultiplexed to access the information carried by a single channel. Conventional wavelength division multiplexers ("WDMs") are used to combine individual signals as well as separate a composite signal into individual wavelength signals.

To separate a composite signal into its components, some conventional wavelength division multiplexers utilize a plurality filters cascaded in series to isolate each channel. Each filter passes light centered around a single wavelength. A filter is typically provided for each of the component wavelength. The output of each filter is the signal centered around a single wavelength. As each component wavelength is separated from the composite signal, the remaining portion of the composite signal is passed on to the next filter in the series. Thus, the signal is separated into its components.

Typically, the composite signal is input to a conventional WDM via an optical fiber. The fiber is typically held by a capillary. The composite signal is then provided to a graduated index of refraction (GRIN) lens for collimating. The signal is then transmitted to the filter. The filter transmits light centered around a particular wavelength. This wavelengths corresponds to one or more channels. The remainder of the composite signal is reflected back to another GRIN lens, capillary, and optical fiber combination. The remainder of the signal may then be transmitted through the optical fiber to a second pair of capillaries, a second pair of GRIN lenses, and filter combination. The second filter transmits light for a second channel. This process continues until the signal is broken into its composite wavelengths.

In one type of conventional wavelength division multiplexer, the filter is fixed at the end of the GRIN lens. Consequently, the angle between the filter and the incident light is fixed. This angle is approximately two degrees. Although such a conventional wavelength division multiplexer can separate a composite signal into its components, the pass band of the filter is fixed. The pass band is the range of wavelengths transmitted by the filter. Consequently, the filter for each channel must be manufactured to have the correct pass band for that channel. The filter itself will, therefore, be subject to tighter specifications in order to ensure that the appropriate portion of the signal is transmitted. The tighter specifications make the filter more expensive. In addition, there may be cross-talk between the incoming composite signal and the portion of the composite signal that is not transmitted by the filter.

In another conventional wavelength division multiplexer, the filter is not affixed at the end of the GRIN lens. Thus, the angle between the GRIN lens and the filter can be adjusted in order to tune the pass band of the filter so that the filter transmits light of the appropriate wavelength. As this angle is adjusted, the angle of incidence between the direction of propagation of the composite signal and a direction approximately perpendicular to the surface of the filter is changed. Changing the angle of incidence changes a central wavelength. The central wavelength is the wavelength around which light transmitted by the filter is centered. Consequently, the filter can be tuned so that the central wavelength is the appropriate wavelength for a desired channel.

Although the filter can be tuned by adjusting the angle between the filter and the GRIN lens, the angle used is typically relatively large. The band with of the filter's pass band decreases at higher angles. The insertion loss for the filter is also increased. In addition, light polarized in the S direction is transmitted differently from light polarized in the P directions. As a result, the polarization dependent loss is dramatically increased.

Accordingly, what is needed is a system and method for tuning a filter, particularly in a wavelength division multiplexer, which does not result in high insertion loss and a high polarization dependent loss. The present invention addresses such a need.

SUMMARY OF THE INVENTION

The present invention provides a method and system for providing a wavelength division multiplexer. The method and system comprise providing a first fiber for carrying an optical signal. The first optical signal includes a plurality of channels. The method and system further comprise providing a holder and providing a filter. The holder has an end and an axis. The holder receives the first fiber. The first fiber and the axis are separated by approximately a distance. The optical signal has an angle of incidence with the filter. The method and system further comprise selecting the distance to tune the angle of incidence so that the filter transmits a substantial portion of the first optical signal centered around at least one particular wavelength. In another aspect, the present invention provides a method and system for filtering an optical signal. In this aspect, the method and system comprise providing a first fiber for carrying the optical signal. The method and system further comprise providing a holder and providing a filter. The holder has an end and an axis. The holder receives the first fiber. The first fiber and the axis are separated by approximately a distance. The optical signal has an angle of incidence with the filter. The method and system further comprise selecting the distance to tune the angle of incidence so that the filter transmits a substantial portion of the first optical signal centered around at least one particular wavelength.

According to the system and method disclosed herein, the present invention provides a wavelength division multiplexer having improved insertion loss and decreased polarization dependent losses.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
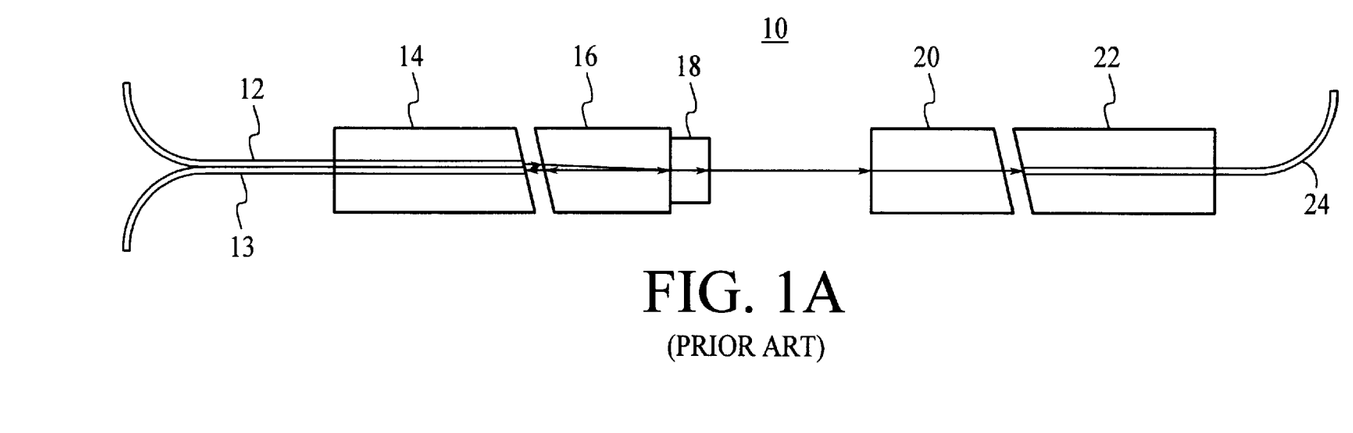
FIG. 1A is a block diagram of a conventional wavelength division multiplexer having a fixed filter

FIG. 1A depicts one embodiment of a conventional wavelength division multiplexer ("WDM") 10 which utilizes filter technology. As depicted in FIG. 1A, the conventional WDM 10 is used to isolate the channels of a composite signal carried on optical fiber 12 having a plurality of channels. Each channel has a different wavelength.

The composite signal is input from the fiber 12 which is held in place by a capillary 14. The combination signal is transmitted to a graduated index of refraction (GRIN) lens 16 which collimates the composite signal. After collimation, the composite signal is transmitted to a filter 18. The filter 18 is typically affixed to the GRIN lens 16. The filter 18 transmits light in a pass band. The pass band is centered around a central wavelength. The transmitted light passes through a second GRIN lens 20 to a second fiber 24 held in place by a second capillary 22. The remainder of the signal is reflected off of the filter 18 and transmitted back through the GRIN lens 16 to the fiber 13 held in place in the capillary 14. Consequently, a first channel can be isolated on the fiber 24. If the remaining signal on the fiber 13 is transmitted to another WDM, not shown, similar to the WDM 10, another channel can be isolated.

Figure 1B:
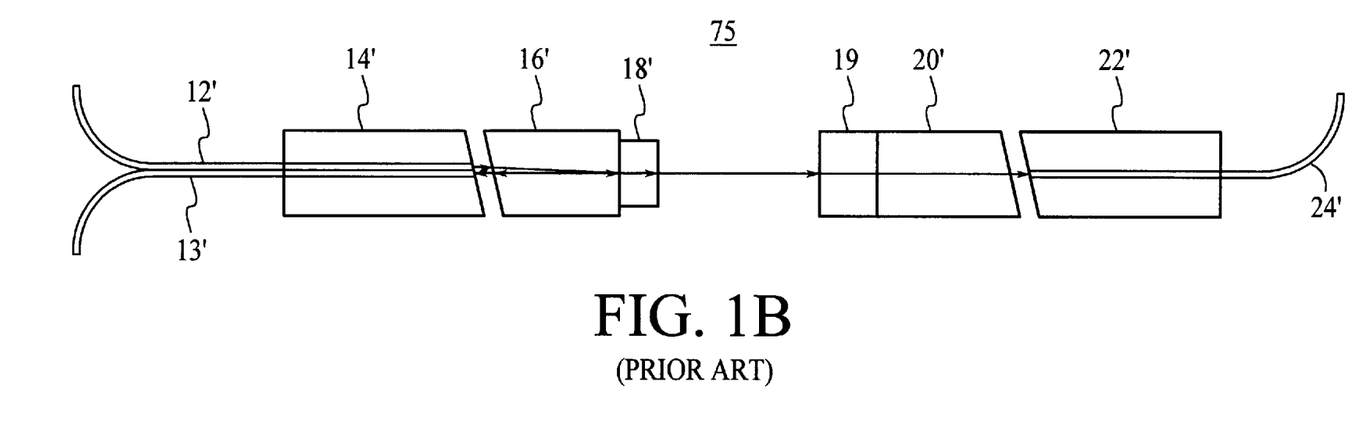
FIG. 1B is a block diagram of another conventional wavelength division multiplexer having a fixed filter.

FIG 1B depicts another embodiment of a conventional WDM 10' having a fixed filter. The conventional WDM 10' is similar to conventional WDM 10. Consequently, the components of conventional WDM 10' having similar function to components of the conventional WDM 10 are labeled similarly. The conventional WDM 10' also includes an isolator 19 for suppressing back reflections of the light signal.

Although the WDMs 10 and 10' are capable of isolating a channel of the composite signal on the fibers 24 and 24', respectively, one of ordinary skill in the art will readily recognize that there are several drawbacks to the WDMs 10 and 10'. The fibers 12 and 13, and the fibers 12' and 13', are placed in very close proximity in the capillary 14 and 14', respectively. Ideally, there would be no separation between the fibers 12 and 13 and between the fibers 12' and 13'. As a result, there is cross-talk between the fibers 12 and 13. For similar reasons, there is cross-talk between the fibers 12' and 13'. In other words, the directivity of the WDM 10 and the WDM 10' is relatively low. In addition, because the filters 18 and 18' are fixed in place, the central wavelength of the pass band of the filter 18 and the filter 18' cannot be tuned. Consequently, a filter 18 or 18' must be chosen so that the pass band, as manufactured, is capable of isolating the appropriate channel.

Figure 1C:
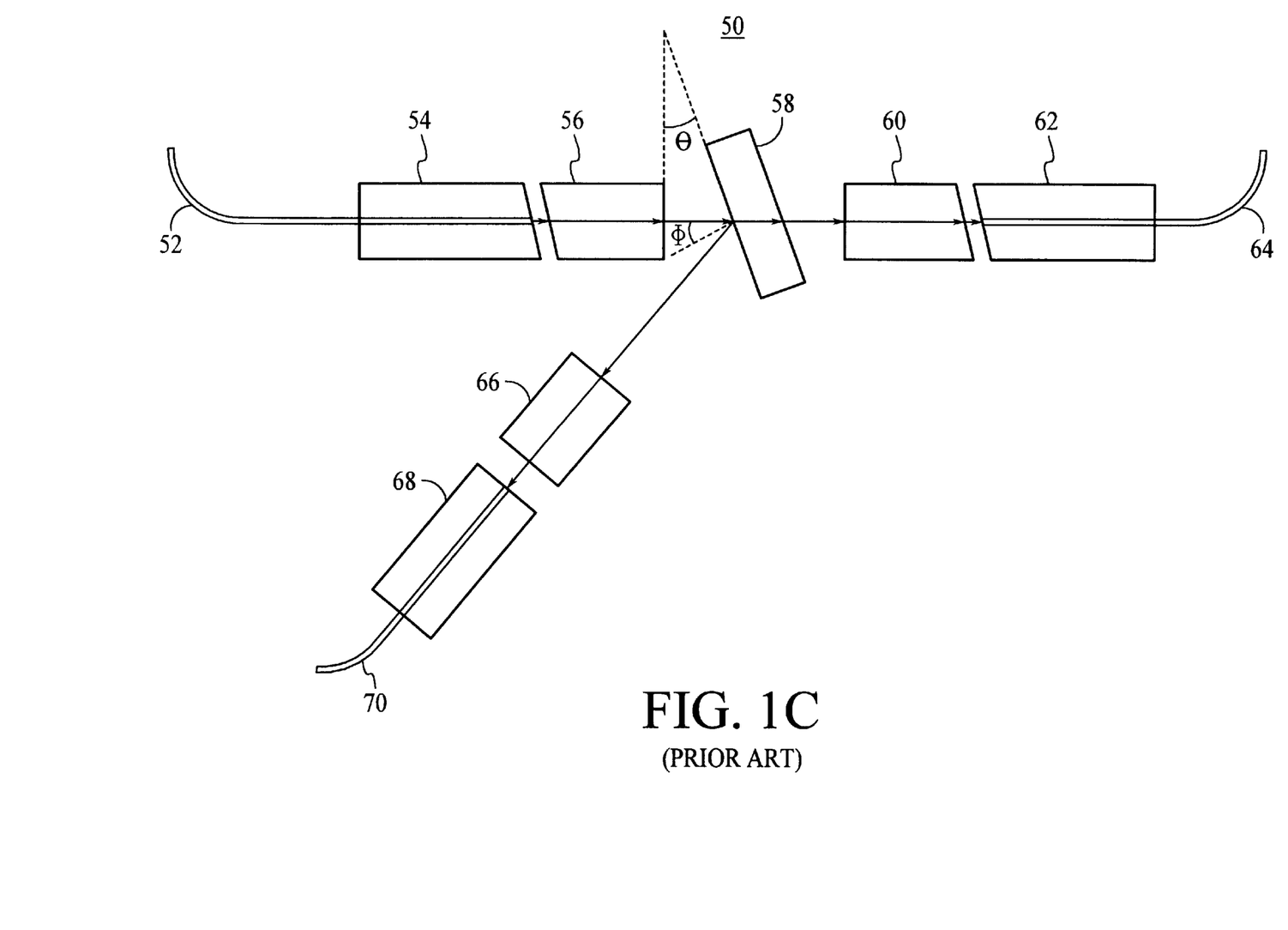
FIG. 1C is a block diagram of another conventional wavelength division multiplexer having a tunable filter.

FIG. 1C is a block diagram of another conventional WDM 50 which utilizes filter technology. As depicted in FIG. 1C, the conventional WDM 50 is used to isolate the channels of a composite signal carried on optical fiber 52 having a plurality of channels. The composite signal is input from the fiber 52 which is held in place by a capillary 54. The combination signal is transmitted to a graduated index of refraction (GRIN) lens 56 which collimates the composite signal. After collimation, the composite signal is transmitted to a filter 58. The filter 58 transmits light in a pass band. The pass band is centered around a central wavelength. The transmitted light passes through a second GRIN lens 60 to a second fiber 64 held in place by a second capillary 62. The remainder of the signal is reflected off of the filter 58 and transmitted through the third GRIN lens 66 to the fiber 70 held in place in the third capillary 68. Consequently, a first channel can be isolated on the fiber 64. If the remaining signal on the fiber 70 is transmitted to another WDM, not shown, similar to the WDM 70, another channel can be isolated.

Note that the WDMs 10 and 50 can also be used to combine signals input through the fibers 12 and 70, respectively, with signals input through the fibers 24 and 64, respectively. The signals input through the fibers 24 and 64 are transmitted by the filters 18 and 58, respectively. The signals input through the fibers 13 and 70, respectively, are reflected by the filters 18 and 58, respectively. In addition, note that the filters 18 and 58 are not ideal. Consequently, although a substantial amount of the light centered around the central wavelength is transmitted by the filters 18 and 58, there may be some losses associated with each of the filters 18 and 58.

The pass band of the filter 18 in the conventional WDM 50 can be tuned to a particular central wavelength. In the conventional WDM 50, the angle between the GRIN lens 56 and the filter 58 is adjusted to tune the filter 58 central wavelength, the wavelength around which the transmitted light is centered. As this angle is adjusted, the angle of incidence, phi, between the direction of propagation of the composite signal and a direction normal to the surface of the filter is changed. Typically, the angle of incidence is relatively large. For example, in some conventional WDMs 50, the angle of incidence may be varied from approximately eight degrees to approximately ten degrees. Changing the angle of incidence changes a central wavelength of the pass band. The range through which the angle of incidence can be varied is related to the range of central wavelengths for which the pass band can be tuned. Consequently, the pass band of the filter can be tuned so that the central wavelength is the appropriate wavelength for a desired channel. As a result, the WDM 50 can be tuned to select the appropriate channel to be provided over the fiber 64. In addition, the conventional WDM 50 has higher directivity because there is a large separation between the fiber 52 in the capillary 54 and the fiber 70 in the capillary 68.

Although the central wavelength can be tuned by adjusting the angle between the filter 58 and the GRIN lens 56, one of ordinary skill in the art will readily recognize that the bandwidth of the pass band (the transmitted light) decreases at higher angles of incidence. The bandwidth is the width of the pass band around the central wavelength. The angle of incidence, which is proportional to the angle between the GRIN lens 56 and the filter 58, is relatively large in the conventional WDM 50. Consequently, the insertion loss for the filter 58 is increased as the angle between the filter 58 and the GRIN lens 56 is increased. One of ordinary skill in the art will also realize that an increase in the angle between the filter 58 and the GRIN lens 56 increases the difference in transmission of the vertical and horizontal components of the polarization of the optical signal. As a result, the polarization dependent loss is dramatically increased.

The present invention provides a method and system for providing a wavelength division multiplexer. The method and system comprise providing a first fiber for carrying a first optical signal. The first optical signal includes a plurality of channels. The method and system further comprise providing a holder, a lens, and a filter. The holder has an end and an axis. The holder receives the first optical fiber. The first optical fiber and the axis are separated by approximately a distance. The lens has a first side and a second side. The lens is for collimating the first optical signal. The first side of the lens is located proximate to the end of the holder. The filter is located proximate to the second side of the lens with respect to the lens. The first optical signal has a first angle of incidence with the filter. The method and system further comprise selecting the distance to tune the first angle of incidence so that the filter transmits a substantial portion of the first optical signal centered around a particular wavelength.

The present invention will be described in terms of a WDM using filter technology. However, one of ordinary skill in the art will readily recognize that this method and system will operate effectively for other types of WDMs or other optical technology which employ filters. For example, the present invention could be utilized in a WDM combined with other components, such as an isolator. Similarly, the present invention could be used in a tap coupler, which uses a tap filter to transmit only a certain fraction of the total light signal.

Figure 2:
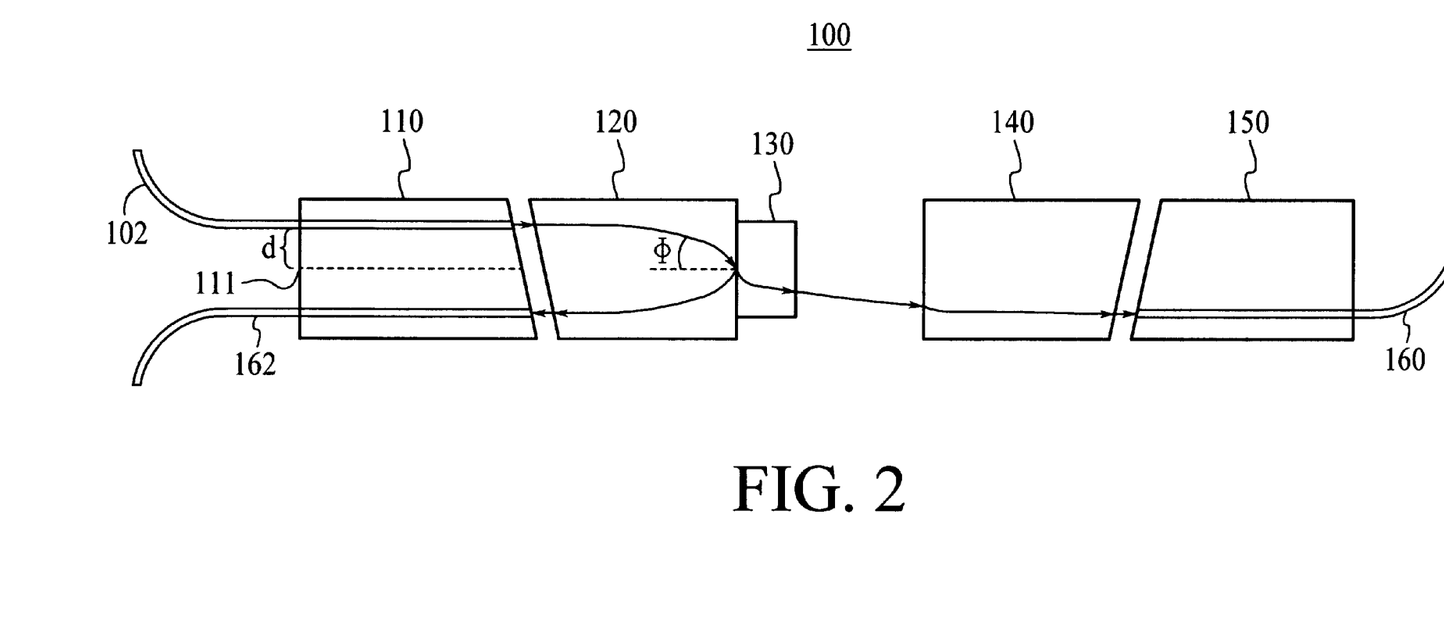
FIG. 2 is a wavelength division multiplexer in accordance with the present invention.

To more particularly illustrate the method and system in accordance with the present invention, refer now to FIG. 2 depicting a block diagram of one embodiment of a WDM 100 in accordance with the present invention. The WDM 100 will be described in terms of isolating a channel of a composite signal input through a fiber 102. However, the WDM 100 could be used to combine signals or isolate a larger number of channels.

A composite signal having multiple channels is input to the WDM 100 via the fiber 102. The fiber 102 is carried by a holder 110. In a preferred embodiment, the holder 110 is a capillary. The holder 110 includes an axis 111. The fiber 102 passes through the holder 110 at a distance of approximately d from the axis 111. The composite signal is then transmitted through a lens 120 which collimates the signal. The lens 120 is preferably a GRIN lens. A filter 130 is locate at the exit of the lens 120. In a preferred embodiment, a face of the filter 130 is substantially flush with a face of the lens 120 through which the composite signal exits. However, nothing prevents the filter 130 from being located farther from the lens 120. Also in a preferred embodiment, the angle between the lens 120 and the filter 130 is very small, as depicted in FIG. 2.

The filter 130 transmits a peak of light centered around a central wavelength. Consequently, the pass band of the filter 130 is centered around the central wavelength. In a preferred embodiment, the WDM 100 is tuned and the filter 130 is selected so that a channel, or group of channels, which a user desires to isolate is centered around the central wavelength. The isolated channel passes through a second lens 140, which is preferably a GRIN lens. The channel is then transmitted by the fiber 160. In addition, the remaining portion of the composite signal not transmitted by the filter 130 is reflected by the filter 130. The remaining portion of the composite signal is reflected off of the filter 130 and transmitted back through the lens 120. The remaining portion of the signal is then transmitted through the fiber 162.

Because the fiber 102 is a distance, d, from the axis 111, the composite signal has an angle of incidence, phi, with the filter 130 after collimation by the lens 120. In addition, the angle of incidence is relatively small. In a preferred embodiment, the angle of incidence is between approximately two degrees and approximately six degrees. The angle of incidence can be changed by changing the distance between the axis 111 and the fiber 102. By changing this distance, the central wavelength of the pass band of the filter 130 can be tuned so that light of desired wavelengths is transmitted by the filter 130. Thus, the incident angle, or central wavelength, of the filter 130 can be tuned while the incident angle remains small. Because the central wavelength can be tuned, the filter 130 need not be extremely accurately manufactured. Consequently, manufacturing of the filter 130 is simplified, and the cost of the filter 130 reduced.

Because the angle of incidence is small, between approximately two degrees and approximately six degrees, the transmission of the two mutually perpendicular components of polarization of the transmitted light is not substantially affected. Consequently, the increase in the polarization dependent loss of the WDM 100 is small. In addition, the bandwidth of the filter 130 is not substantially reduced. As a result, the insertion loss of the filter 130 is not substantially increased despite the fact that the incident angle of the filter 130 is tuned to transmit the desired channel(s). Although the angle of incidence is relatively small, the tunable range of the angle of incidence is similar to the conventional tunable WDM 50. For example, in a preferred embodiment, the angle of incidence can vary between approximately two degrees and approximately six degrees. The range for the angle of incidence in such an embodiment is approximately four degrees. As a result, the range of central wavelengths over which the pass band of the filter 130 can be tuned is still relatively large. Consequently, the insertion loss and polarization dependent loss ("PDL") are reduced by tuning the angle of incidence over a range of angles having a smaller absolute value than in a conventional WDM 50.

In addition, the directivity of the WDM 100 is relatively high. The fiber 102, on which the composite signal is input, and the fiber 162, which carries the portion of the composite signal reflected off of the filter 130, are separated by approximately twice the distance used to tune the filter 130. Because the fiber 102 and 162 are separated, there is relatively little cross talk between the fibers 102 and 162. Consequently, the directivity of the WDM 100 is relatively high.

Figure 3:
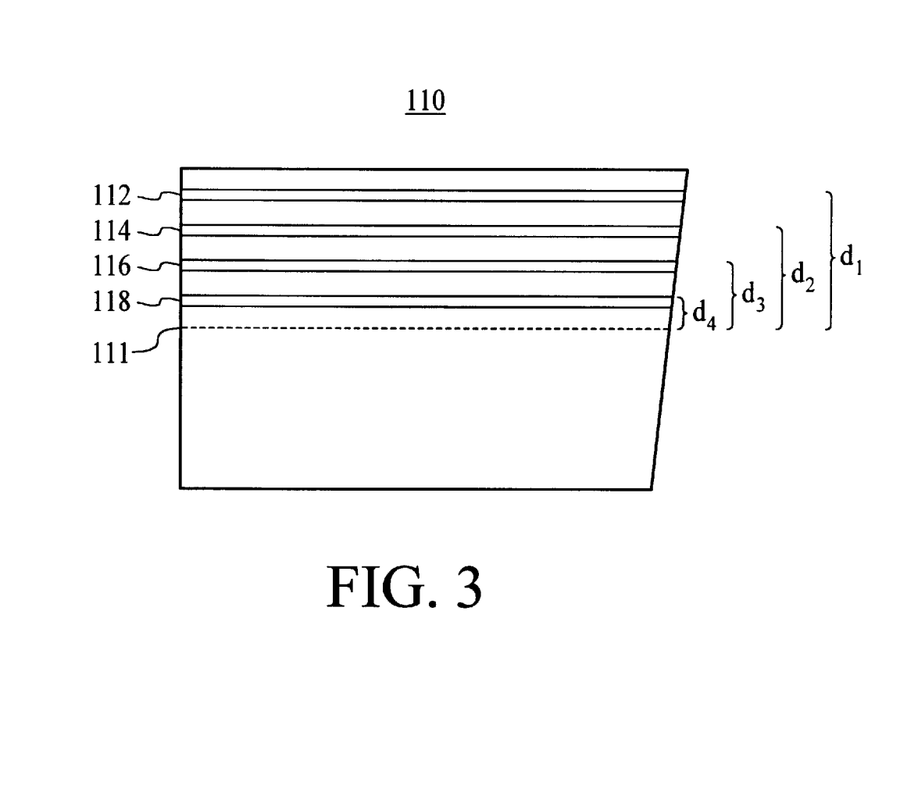
FIG. 3 is a block gram of an alternate embodiment of a holder in accordance with the present invention.

FIG. 3 depicts an alternate embodiment of the holder 110. The holder 110 has an axis 111. In addition, channels 112, 114, 116, and 118 are provided at distances $d_1$, $d_2$, $d_3$, and $d_4$, respectively. By placing the fiber 102 in the appropriate channel 112, 114, 116, or 118, the appropriate distance for tuning the filter 130 to the desired central wavelength can be chosen.

Figure 4:
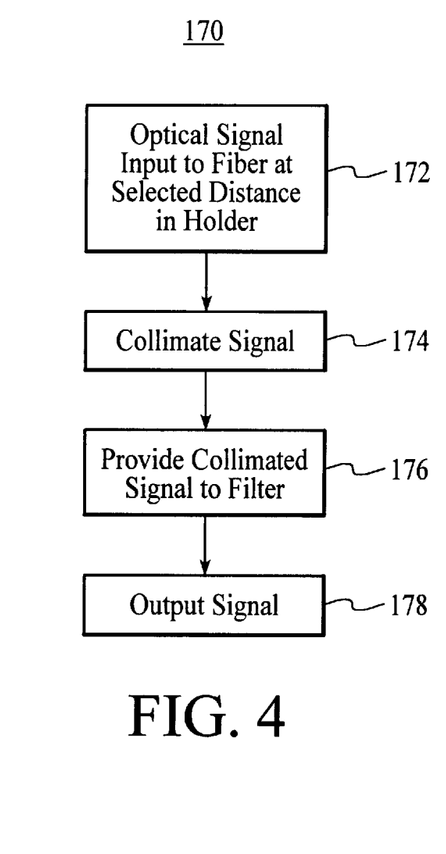
FIG. 4 is a flow chart depicting a method for separating the composite signal into its channels in accordance with the present invention.

FIG. 4 depicts a method 170 for isolating at least one channel of the composite signal used in conjunction with the WDM 100 and the holder 110. The optical signal is provided to the input fiber 102 which is located at the appropriate distance from the central axis 111 via step 172. Thus, the fiber 102 is located in one of the channels 112, 114, 116, or 118. The composite signal is then collimated by the lens 120 via step 174. The composite signal is then provided to the filter 130 via step 176. Because the distance has been properly selected, the filter 130 is tuned to transmit light for the at least one channel. The isolated channel can then be output via step 178.

Figure 5:
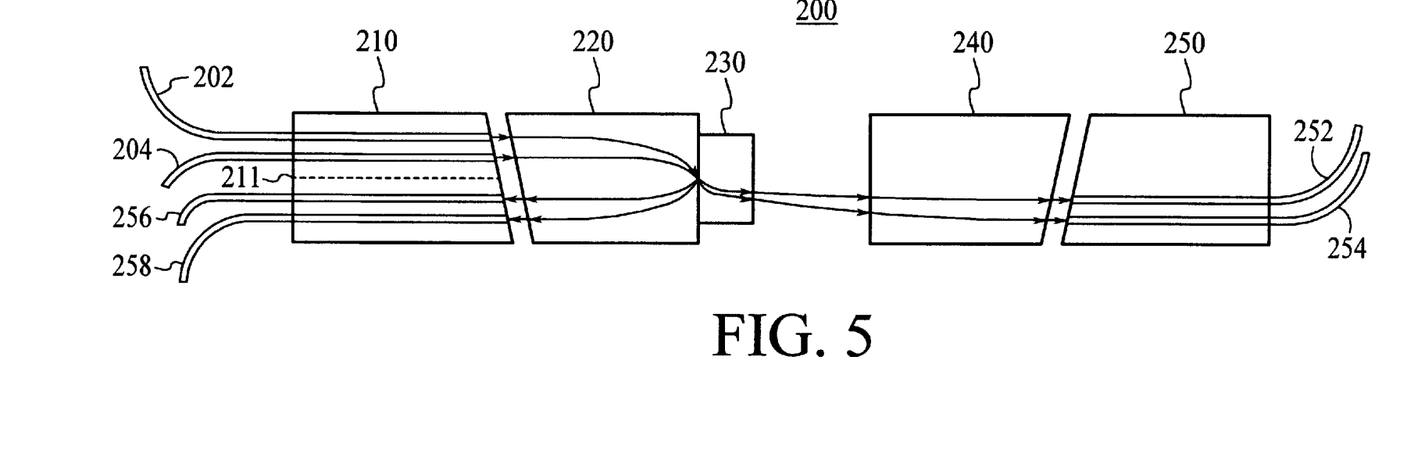
FIG. 5 is a block diagram of an alternate embodiment of a wavelength division multiplexer in accordance with the present invention.

FIG. 5 depicts an alternate embodiment of a WDM 200 in accordance with the present invention. The WDM 200 includes two input fiber 202 and 204 which pass through the holder 210. The fibers 202 and 204 are distance $d_1$ and $d_2$, respectively, from the central axis 211 of the holder 210. Each fiber 202 and 204 carries a composite signal. The signals from fibers 202 and 204 are transmitted to a lens 220 which collimates both signals. Because of the distances $d_1$ and $d_2$, each composite signal has an angle of incidence with a filter 230. Consequently, the filter 230 is tuned to transmit a light centered around a different wavelength for each of the composite signals. The isolated channels are then transmitted to a second lens 240 and output over the fibers 252 and 254. The portion of the signals input from fibers 202 and 204, respectively, that are reflected by the filter 230 are transmitted to the fibers 258 and 256, respectively. As a result, the WDM 200 is capable of isolating two different channels from two composite signals. In addition, by coupling the fibers 258 and 256 to additional WDMs, the remaining channels of the composite signals can be isolated. Note that although the WDM 200 is depicted as having two input signals, nothing prevents the WDM 200 from having a larger number of input signals where more fibers are provided in the capillary 210.

The WDM 200 possesses the benefits of the WDM 100. Consequently, the WDM 200 has a relatively small angle of incidence, has relatively low PDL, relatively low insertion loss, and relatively high directivity. The cost of the filter 230 is also reduced because the central wavelength can be tuned. Moreover, a WDM 200 can reduce the cost and space required to separate a composite signal into its components signals. At least two signals can be input to each WDM 200, which includes only one filter 230. Since a single filter 230 is used to isolate multiple channels, fewer filters are required. The cost of a filter 230 is relatively high. Requiring fewer filters reduces the cost of the WDM 200. In addition, because a separate WDM 200 is not required for each channel being isolated, the WDM 200 requires less space than a conventional WDM 10 or WDM 50. Thus, the WDM 200 may cost less and require less space.

Figure 6:
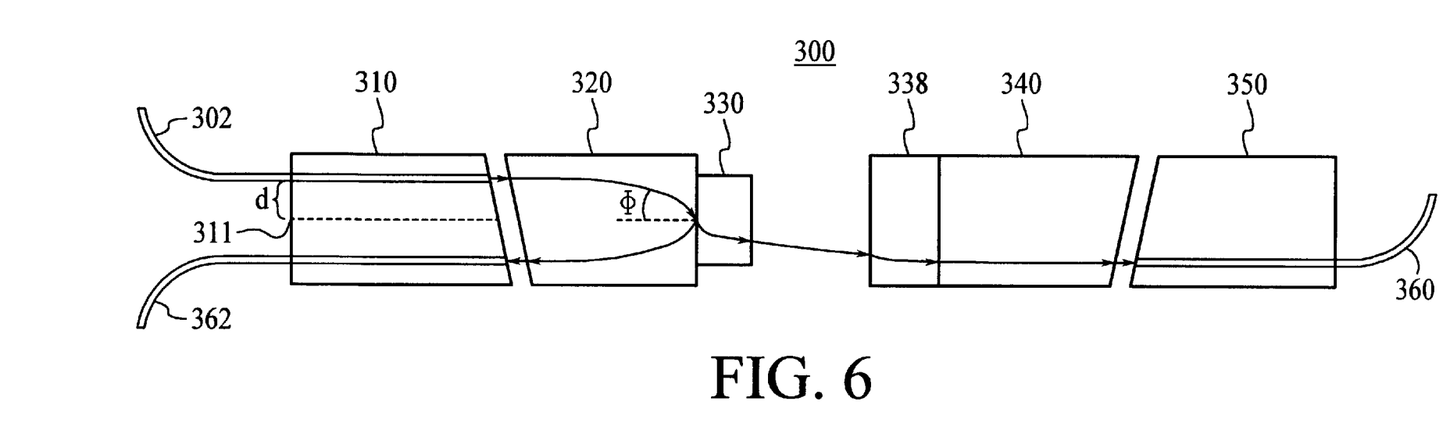
FIG. 6 is a block diagram of another alternate embodiment of a wavelength division multiplexer and isolator combination in accordance with the present invention.

FIG. 6 depicts another WDM 300 in accordance with the present invention. The WDM 300 is similar to the WDM 100 depicted in FIG. 2. However, the WDM 300 also includes an isolator 338. The WDM 300 possesses the benefits of the WDM 100. Consequently, the WDM 300 has a relatively small angle of incidence, has relatively low PDL, relatively low insertion loss, and relatively high directivity. The cost of the filter 330 is also reduced.

Finally, the method and system can be used in optical technology in which filtering is desirable. The signal desired to be filtered could be input to the system 100 or 200 and used in conjunction with the method 170 to filter the signal. In such a system, the distance would be selected to tune the filter 130 or 230 so that the light transmitted by the filter 130 or 230 includes the signal to be filtered.

A method and system has been disclosed for providing a WDM and a filter having improved insertion loss and reduced polarization dependent loss. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for filtering an optical signal comprising:

a first fiber for carrying an optical signal including a plurality of channels;

a holder having an aperture therein as well as an end and an axis, the holder receiving the first fiber in the aperture, the aperture and the first fiber being separated from the axis by approximately a distance;

a filter which the optical signal impacts at a first angle of incidence after transmission through the first fiber, the filter transmitting a portion of the optical signal centered around at least one particular wavelength; and an isolator optically coupled with the filter, the isolator preventing a first portion of the portion of optical signal transmitted by the filter from returning to the first fiber, wherein the distance is selected to tune the first angle of incidence so that the filter transmits the portion of the optical signal centered around the at least one particular wavelength.

2. The system of claim 1 wherein the filter further comprises:

a tap filter for transmitting a particular fraction of the optical signal.

3. The system of claim 2 further comprising:

a lens having a first side and a second side, the lens for collimating the optical signal, the first side of the lens located proximate to the end of the holder; and wherein the filter is located proximate to the second side of the lens.

4. A wavelength division multiplexer comprising:

a first fiber for carrying an optical signal including a plurality of channels;

a holder having an aperture therein as well as an end and an axis, the holder receiving the first fiber in the aperture, the aperture and the first fiber being separated from the axis by approximately a distance;

a filter which the optical signal impacts at a first angle of incidence after transmission through the first fiber, the filter transmitting a portion of the optical signal centered around at least one particular wavelength; and an isolator optically coupled with the filter, the isolator preventing a first portion of the portion of optical signal transmitted by the filter from returning to the first fiber;

wherein the distance is selected to tune the first angle of incidence so that the filter transmits the portion of the optical signal centered around the at least one particular wavelength.

5. The wavelength division multiplexer of claim 4 further comprising:

a lens having a first side and a second side, the lens for collimating the optical signal, the first side of the lens located proximate to the end of the holder; and wherein the filter is located proximate to the second side of the lens.

6. The wavelength division multiplexer of claim 5 wherein the first angle is between approximately two degrees and approximately six degrees.

7. The wavelength division multiplexer of claim 6 further comprising:

a second fiber optically coupled with the filter; and wherein the distance is selectable to tune the first angle of incidence so that the filter transmits a substantial portion of the optical signal centered around one of a plurality of wavelengths and reflects a remaining portion of the optical signal to the second fiber.

8. A wavelength division multiplexer comprising:

a first plurality of fibers, each of the first plurality of fibers for carrying a corresponding optical signal including a plurality of channels;

a holder having a plurality of apertures therein as well as an end and an axis, the holder receiving the first plurality of optical fibers in the plurality of apertures, each of the plurality of apertures and the each of the first plurality of optical fibers being separated from the axis by approximately a corresponding distance;

a filter which each of the corresponding optical signals impact at a corresponding angle of incidence after transmission through each of the first plurality of fibers, the filter transmitting a portion of each of the corresponding optical signals centered around a corresponding wavelength; and an isolator optically coupled with the filter, the isolator preventing a first portion of the portion of each of the corresponding optical signals transmitted by the filter from returning to the first plurality of fibers;

wherein the corresponding distance is selected to tune the angle of incidence so that the filter transmits the portion of each of the corresponding optical signals centered around the corresponding wavelength.

9. The wavelength division multiplexer of claim 8 further comprising:

a lens having a first side and a second side, the lens for collimating the plurality of optical signals, the first side of the lens located proximate to the end of the holder; and wherein the filter is located proximate to the second side of the lens.

10. The wavelength division multiplexer of claim 9 wherein each of the corresponding angles is between approximately two degrees and approximately six degrees.

11. The wavelength division multiplexer of claim 10 further comprising:

a second plurality of fibers optically coupled with the filter; and wherein each of the corresponding distances are selectable to tune the angle of incidence so that the filter transmits a substantial portion of each of the corresponding optical signals centered around the corresponding wavelength and reflects a remaining portion of each of the corresponding optical signals to a particular fiber of the second plurality of fibers.

12. A method for providing a wavelength division multiplexer comprising the steps of:

(a) providing at least one fiber for carrying an optical signal including a plurality of channels;

(b) providing a holder having at least one aperture therein as well as an end and an axis, the at least on aperture of the holder receiving the at least one fiber, the at least one aperture and the at least one fiber and the axis being separated by approximately a distance;

(c) providing a filter, the optical signal making a first angle of incidence with the filter after transmission through the at least one fiber, the filter transmitting a portion of the optical signal centered around a particular wavelength;

(d) providing an isolator optically coupled with the filter, the isolator preventing a first portion of the portion of the optical signal transmitted by the filter from returning to the at least one fiber; and (e) selecting the distance to tune the first angle of incidence so that the filter transmits the portion of the optical signal centered around the particular wavelength.

13. The method of claim 12 further comprising the step of:

(f) providing a lens having a first side and a second side, the lens for collimating the first optical signal, the first side of the lens located proximate to the end of the holder;

wherein the filter is located proximate to the second side of the lens.

14. The method of claim 13 wherein the first angle is between approximately two degrees and approximately six degrees.

15. A method for separating at least one channel from an optical signal having a plurality of channels, the method comprising the steps of:

(a) providing the optical signal over at least one fiber, the at least one fiber being received in a holder having at least one aperture therein as well as an end and an axis, the at least one aperture and the at least one fiber being separated from the axis by approximately a distance;

(b) providing the optical signal to a filter, the optical signal having an angle of incidence with the filter, the filter transmitting a portion of the optical signal centered around a particular wavelength; and (c) providing the optical signal to an isolator optically coupled with the filter, the isolator preventing a first portion of the portion of the optical signal transmitted by the filter from returning to the at least one fiber; and such that the distance tunes the angle of incidence so that the filter transmits the portion of the at least one channel of the first optical signal.

16. The method of claim 15 wherein the angle of incidence is between approximately two degrees and approximately six degrees.

17. The method of claim 16 further comprising the step of:

(d) collimating the optical signal through a lens having a first side and a second side, the first side of the lens located proximate to the end of the holder and the second side of the lens located proximate to the filter.

* * * * *